US008777429B2

(12) United States Patent
Snegg

(10) Patent No.: US 8,777,429 B2
(45) Date of Patent: Jul. 15, 2014

(54) BLIND SPOT MIRROR

(76) Inventor: Harry Snegg, Long Beach, CA (US)

( * ) Notice: Subject to any disclaimer, the term of this patent is extended or adjusted under 35 U.S.C. 154(b) by 205 days.

(21) Appl. No.: 12/332,201

(22) Filed: Dec. 10, 2008

(65) Prior Publication Data
US 2010/0142068 A1 Jun. 10, 2010

(51) Int. Cl.
G02B 5/10 (2006.01)
G02B 7/182 (2006.01)
B60R 1/08 (2006.01)

(52) U.S. Cl.
CPC . B60R 1/082 (2013.01); G02B 5/10 (2013.01); G02B 7/182 (2013.01)
USPC ............................ 359/868; 359/872; 248/481

(58) Field of Classification Search
USPC .................... 359/868, 872; 248/481
See application file for complete search history.

(56) References Cited

U.S. PATENT DOCUMENTS

| 1,324,456 | A | * | 12/1919 | Lutz | 248/481 |
|---|---|---|---|---|---|
| 2,455,919 | A | * | 12/1948 | Daon | 248/482 |
| 2,857,810 | A | * | 10/1958 | Troendle | 359/868 |
| 3,104,274 | A | | 9/1963 | King | |
| 3,131,250 | A | | 4/1964 | Ely | |
| 3,131,251 | A | * | 4/1964 | Ryan | 248/467 |
| 3,171,886 | A | * | 3/1965 | Holt et al. | 359/514 |
| 3,316,052 | A | * | 4/1967 | Ross | 359/872 |
| 3,338,545 | A | * | 8/1967 | Magi | 248/481 |
| 3,445,151 | A | * | 5/1969 | Stefanakis | 359/514 |
| 3,454,692 | A | | 7/1969 | Marcus | 264/135 |
| 3,734,447 | A | * | 5/1973 | Perison, Sr. | 248/481 |
| 4,187,001 | A | * | 2/1980 | Redwitz et al. | 359/726 |
| 4,200,359 | A | | 4/1980 | Lawson | |
| 4,223,983 | A | | 9/1980 | Bloom | |
| 4,293,191 | A | | 10/1981 | Kim | |
| 4,311,363 | A | | 1/1982 | Marsalka et al. | |
| 4,526,446 | A | * | 7/1985 | Adams | 359/864 |
| 4,629,296 | A | | 12/1986 | White | |
| 4,696,555 | A | * | 9/1987 | Enomoto | 359/874 |
| 4,832,476 | A | | 5/1989 | Gabrielyan | |
| 4,863,254 | A | | 9/1989 | Dyer | |
| 4,877,214 | A | * | 10/1989 | Toshiaki et al. | 248/483 |
| 4,890,908 | A | * | 1/1990 | Casey | 359/865 |
| 4,892,400 | A | * | 1/1990 | Brookes et al. | 359/865 |
| 4,932,769 | A | | 6/1990 | Goosen | |
| 4,941,638 | A | * | 7/1990 | DiSalvatore | 248/481 |
| 4,998,814 | A | * | 3/1991 | Perry | 359/871 |

(Continued)

FOREIGN PATENT DOCUMENTS

GB 2252946 * 8/1992

Primary Examiner — Ricky D Shafer
(74) Attorney, Agent, or Firm — JP Webb; Jason P. Webb; Danny Y. H. Cheng

(57) ABSTRACT

A blind spot mirror configured to attach to an automobile, thereby providing an enhanced view, comprising a base having a flat rear surface configured to couple to an automobile mirror. The blind spot mirror also includes a mirror housing pivotally coupled to the base through a ball and socket coupling member, wherein the ball and socket coupling member is coupled to the mirror housing substantially off-center on the mirror housing. The ball and socket coupling member is disposed substantially off-center to the mirror housing, 60/40 respectively. The blind spot mirror further includes a mirror disposed within the mirror housing and coupled thereto through a hook and groove coupling device. The mirror is inset into a receiving portion around the perimeter of the mirror housing and secured to the hook and groove coupling device.

16 Claims, 3 Drawing Sheets

(56) References Cited

U.S. PATENT DOCUMENTS

| | | |
|---|---|---|
| 5,044,739 A | 9/1991 | do Espirito Santo |
| 5,106,177 A * | 4/1992 | Dolasia ................. 359/876 |
| 5,165,081 A * | 11/1992 | Drumheller ............ 359/854 |
| 5,178,448 A * | 1/1993 | Adams et al. .......... 362/494 |
| 5,327,288 A * | 7/1994 | Wellington et al. .... 359/606 |
| 5,587,236 A * | 12/1996 | Agrawal et al. ........ 428/334 |
| 5,604,644 A * | 2/1997 | Lang et al. ............. 359/871 |
| 5,615,857 A * | 4/1997 | Hook ...................... 248/549 |
| 5,669,698 A * | 9/1997 | Veldman et al. ........ 362/494 |
| 5,671,996 A * | 9/1997 | Bos et al. ............... 362/488 |
| 5,760,980 A * | 6/1998 | Lang ....................... 359/872 |
| 6,022,113 A * | 2/2000 | Stolpe et al. ........... 359/841 |
| 6,282,771 B2 * | 9/2001 | Englander ................ 29/450 |
| 6,328,451 B1 * | 12/2001 | Lang ....................... 359/871 |
| 6,352,348 B1 * | 3/2002 | Lang et al. ............. 359/881 |
| 7,033,033 B2 * | 4/2006 | Ishigami ................. 359/872 |
| 7,104,660 B2 * | 9/2006 | Sakata et al. ........... 359/841 |
| 2002/0027727 A1 * | 3/2002 | Lang et al. ............. 359/879 |
| 2002/0186481 A1 * | 12/2002 | Martinson ............... 359/855 |
| 2003/0007265 A1 * | 1/2003 | Norman ................... 359/871 |
| 2004/0021965 A1 * | 2/2004 | Wolf et al. .............. 359/877 |

\* cited by examiner

BLIND SPOT MIRROR

BACKGROUND OF THE INVENTION

1. Field of the Invention

The present invention relates to mirrors, specifically to a blind spot mirror.

2. Description of the Related Art

Viewing a blind spot in a vehicle is a standard motion as one is trying to make a turn or change lanes. Different vehicles have different blind spots, larger vehicles have bigger blind spots, as the vehicle is longer and, therefore has a larger blind spot area. Smaller vehicles have a smaller blind spot, but nonetheless smaller vehicles still have a blind spot area. Mirrors have been incorporated to existing vehicle mirrors to improve viewing the blind spot area, either by coupling an extra mirror to the vehicle mirror or adding additional mirrors to the vehicle itself. Some improvements have been made in the field. Examples of references related to the present invention are described below, and the supported teachings of each reference are incorporated by reference herein:

U.S. Pat. No. 3,131,250, issued to Ely, discloses an accessory for attachment to a conventional planar rear view mirror adjustably mounted on a side of a vehicle to afford the driver a rearward view, said accessory including the combination of: a wedge-shaped supporting member having a planar front face and a planar rear face inclined thereto, said rear face being larger than the mirror portion on the said conventional rear view mirror to be covered by said front face, said mirror-supporting surface having a predominant direction of extension, there being a first fixed angle of inclination within the range of ½ degree to 4 degrees measured in a reference plane extending perpendicularly to said predominant direction of extension, there being defined a second fixed angle.

U.S. Pat. No. 4,293,191, issued to Kim, discloses an adjustable convex rearview mirror comprising a mirror housing carrying a convex mirror and a support housing pivotally coupled to the mirror housing and adapted to be rigidly secured to a planar surface, such as the exterior rearview mirror of a motor vehicle. The mirror housing telescopically receives a part of the support housing therein. The support housing has a cantilever arm thereon with a pin at the distal end. This pin is selectively received in a plurality of apertures in the mirror housing to selectively adjust the angular alignment of the mirror relative to the support housing.

U.S. Pat. No. 4,200,359, issued to Lawson, discloses a mirror assembly for a vehicle. A small, flat mirror is mounted through use of a wedge-shaped adhesive block to the inside portion of a conventional side view mirror. The block positions the small mirror at an angle of about 15.degree. to 20.degree. with respect to the plane of the side view mirror to thereby eliminate the "blind spot" to the side and the rear of the vehicle.

U.S. Pat. No. 4,832,476, issued to Gabrielyan, discloses a Blind Spot Rear-View Mirror Assembly System whereby the blind spot to either rear side of the driven vehicle can be observed by the operator. Such system comprises a secondary mirror assembly swivally mounted to the primary or interiorly mounted rear-view mirror assembly in the vehicle. The system includes a base member mounted to the back wall of the primary assembly, and on which a pivot mechanism is mounted, a rod-and-ball arrangement pivotally mounted to such mechanism, with the ball being universally swiveably in a socket in the secondary mirror assembly. A retainer is mounted on the base member to retain the rod in its adjustable length-wise position to the primary assembly with such retention also preventing the primary assembly from freely pivoting about the pivot mechanism, the rod becoming automatically free of the retainer in the event the body of operator or passenger strikes the secondary assembly in a jarring collision.

U.S. Pat. No. 4,863,254, issued to Dyer, discloses: an auxiliary mirror having a base with perpendicular members for abutment with a vehicle mirror housing. An extension on one of the members carries the auxiliary mirror. Elastic straps with hook elements secure the base to the mirror housing. The base is shaped to abut the mirror housing perimeter.

The inventions heretofore known suffer from a number of disadvantages which include being limited in application, being limited in adaptability, being ineffective, being expensive, being limited in versatility, being bulky, and being non-durable.

What is needed is a blind spot mirror that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available blind spot mirrors. Accordingly, the present invention has been developed to provide a more effective and more versatile blind spot mirror.

In one embodiment, there is a blind spot mirror configured to attach to an automobile, thereby providing an enhanced view. The blind spot mirror may include a base having a flat rear surface configured to couple to an automobile mirror. The flat rear surface of the base may include an adhesive, which is configured to couple the base to an automobile mirror. The blind spot mirror may also include a mirror housing pivotally coupled to the base through a ball and socket coupling member. The ball and socket coupling member may be coupled to the mirror housing substantially off-center on the mirror housing. In addition, the socket coupling member may be coupled to the base, wherein the socket coupling member may be disposed opposite of the flat rear surface. Furthermore, the ball coupling member may be coupled to the mirror housing, wherein the ball coupling member may be disposed opposite of the mirror.

The blind spot mirror may further include a mirror disposed within the mirror housing and coupled thereto through a hook and groove coupling device. The mirror may be inset into a receiving portion around the perimeter of the mirror housing and secured to the hook and groove coupling device. The mirror may also include a first hook and a second hook disposed on the underside of the mirror. In addition, the mirror housing may further include a first groove and a second groove configured to secure to the first hook and the second hook, respectively. The blind spot mirror may be coupled to an automobile mirror, wherein the ball and socket coupling member may be disposed substantially off-center to the mirror housing, 60/40 respectively. Furthermore, the blind spot mirror may be coupled to an automobile mirror, wherein the ball and socket coupling member is disposed substantially off-center to the mirror housing, 70/30 respectively.

Reference throughout this specification to features, advantages, or similar language, does not imply that all of the features, and advantages, that may be realized with the present invention should be, or are, in any single embodiment of the invention. Rather, language referring to the features, and advantages, is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features, or advantages, of a particular embodiment. In other instances, additional features, and advantages, may be recognized in certain embodiments that may not be present in all embodiments of the invention.

These features, and advantages, of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention, briefly described above, will be rendered by reference to specific embodiments that are illustrated in the appended drawing(s). It is noted that the drawings of the invention are not to scale. The drawings are mere schematic representations, not intended to portray specific parameters of the invention. Understanding that these drawing(s) depict only typical embodiments of the invention and are not, therefore, to be considered to be limiting in its scope, the invention will be described and explained with additional specificity and detail through the use of the accompanying drawing(s), in which.

DETAILED DESCRIPTION OF THE INVENTION

Figure 1:
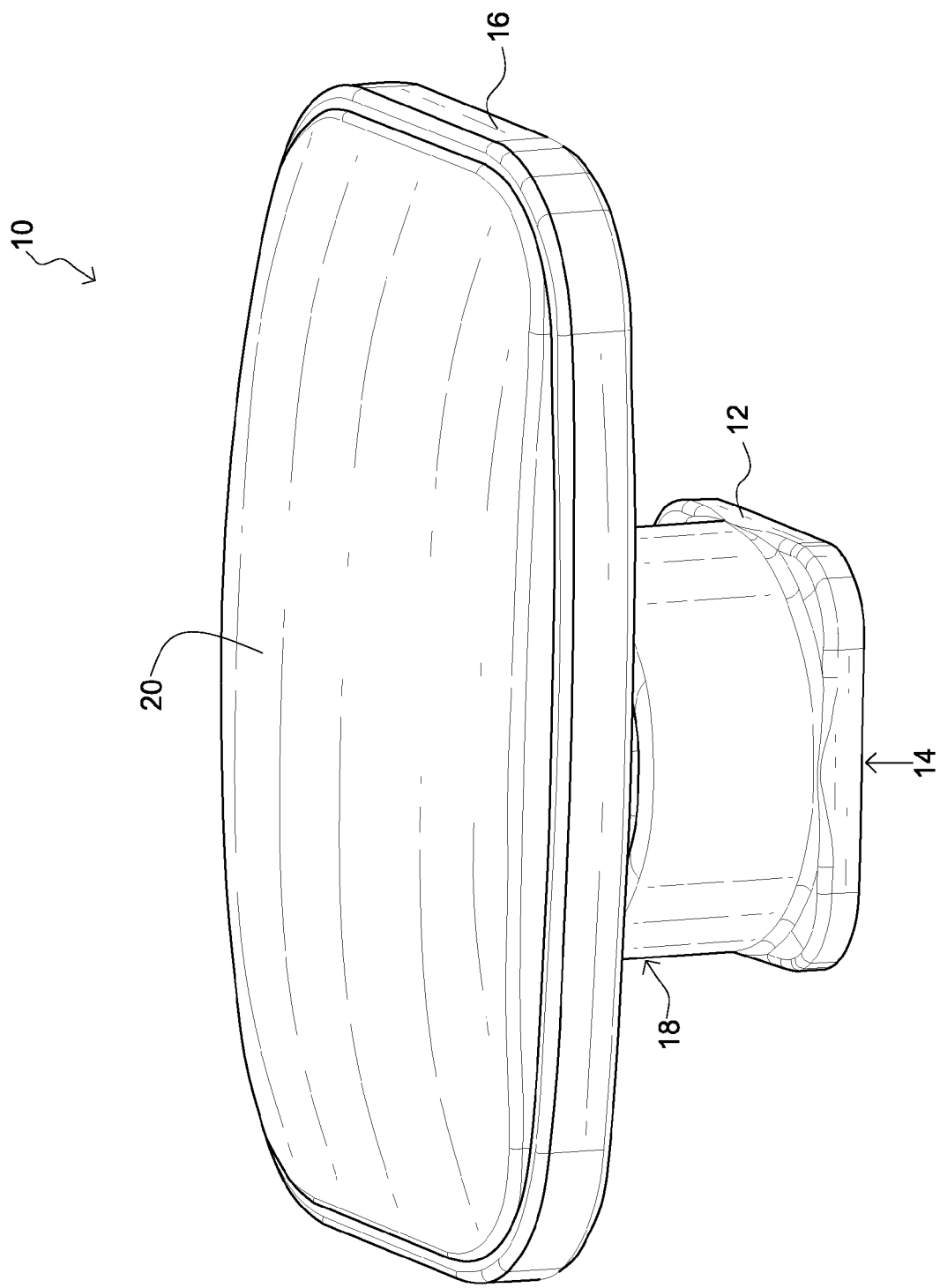
FIG. 1 is a perspective view of a blind spot mirror, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like, described herein are considered to be able to be combined in whole, or in part, one with another as the claims and/or art may direct, either directly or indirectly, implicitly or explicitly.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates a perspective view of a blind spot mirror 10, according to one embodiment of the invention, wherein the blind spot mirror 10 is configured to attach to an automobile, thereby providing an enhanced view. The blind spot mirror 10 includes a base 12 having a flat rear surface 14 configured to couple to an automobile mirror. The flat rear surface 14 of the base 12 includes an adhesive, configured to couple the base 12 to an automobile mirror. The blind spot mirror 10 also includes a mirror housing 16 pivotally coupled to the base 12 through a ball and socket coupling member 18. The mirror housing 16 is coupled to a mirror 20, wherein the mirror 20 is disposed within the mirror housing 16.

Figure 2:
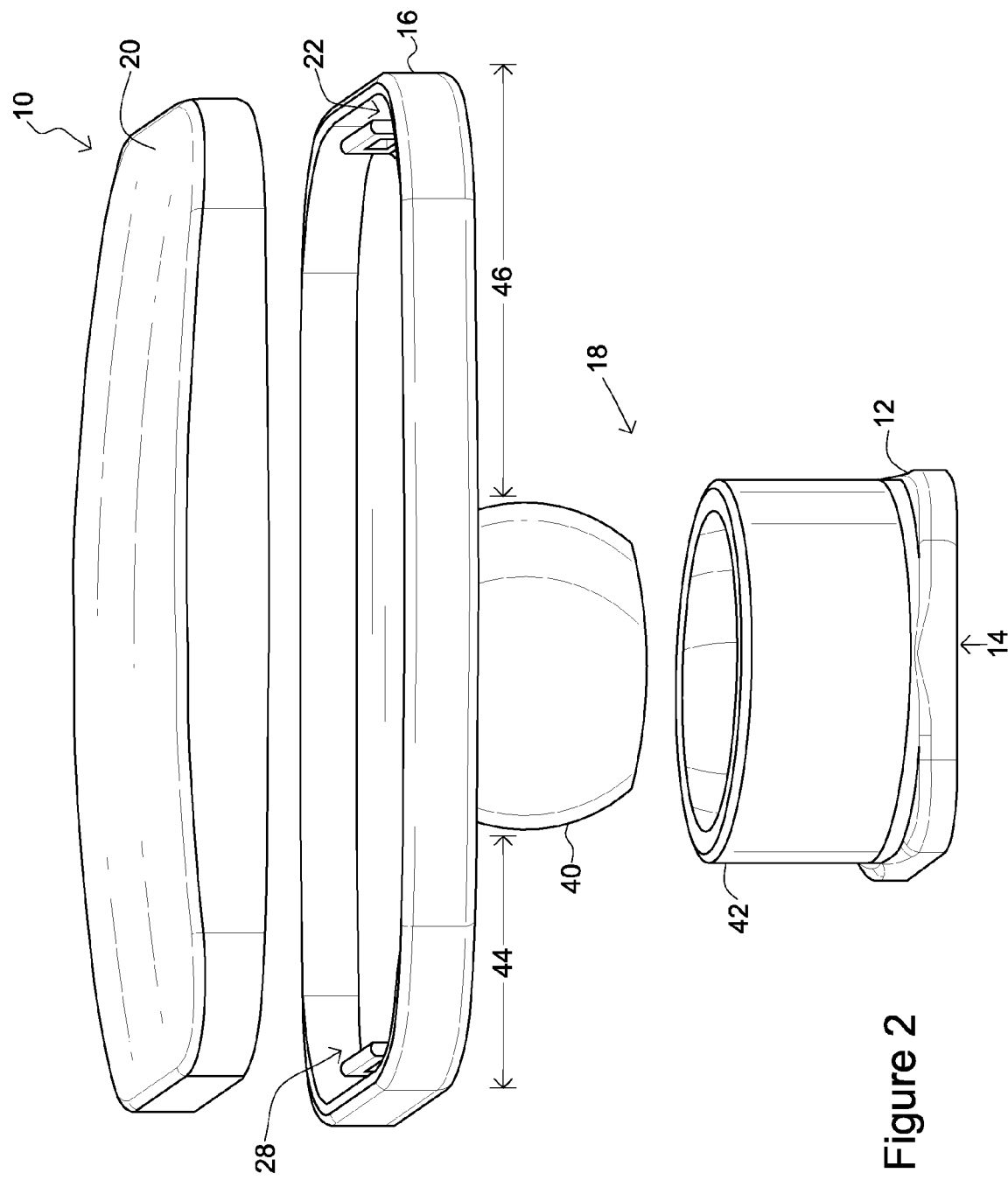
FIG. 2 is a exploded side elevational view of a blind spot mirror, according to one embodiment of the invention.

FIG. 2 illustrates an exploded view of a blind spot mirror 10, according to one embodiment of the invention, wherein the mirror 20 is inset into a receiving portion 22. The receiving portion 22 is disposed around the perimeter of the mirror housing 16. The mirror 20 is coupled to the receiving portion 22 by a hook and groove coupling device 28. The illustrated hook and groove coupling device includes a hook shaped protrusion extending from an underside of the mirror that cooperates with a U-shaped protrusion extending from the receiving portion and disposed interior the circumference of the receiving portion. Accordingly, when the mirror is pressed against the receiving portion and the hook and groove system is aligned, the hook is momentarily deformed and then snaps into a locked mode being retained by the U-shaped protrusion. The illustrated system includes a pair of oppositely disposed hook and groove coupling systems configured to cooperate to secure the mirror to the receiving portion.

It is understood that in one embodiment of the invention, the hook protrudes from the receiving portion, and the U-shaped portion protrudes from the mirror. Moreover, the groove may include a protrusion having a groove not extending through the entirety of the protrusion and, therefore, might not form a U-shape but instead merely a well-shaped groove having a floor.

As illustrated in FIG. 2, the blind spot mirror 10 includes a ball and socket coupling member 18, wherein the ball and socket member 18 is coupled to the mirror housing 16 substantially off-center. The socket coupling member 42 is coupled to the base 12, wherein the socket coupling member 42 is disposed opposite of the flat rear surface 14 relative to the base 12. The ball coupling member 40 is coupled to the mirror housing 16, disposed opposite of the mirror 20 relative to the mirror housing 16. The ball and socket coupling member 18 is disposed substantially off-center to the mirror housing, 60/40 respectively. As illustrated in FIG. 2, the ball and socket coupling member 18 is disposed substantially off-center, wherein there is a ratio of seventy percent of the total distance of the mirror housing minus the ball 46 disposed on a first side of the ball and socket coupling member 18 and a thirty percent of the total distance minus the ball 44 disposed on a second side of the ball and socket coupling member 18 on mirror housing 16.

Figure 3:
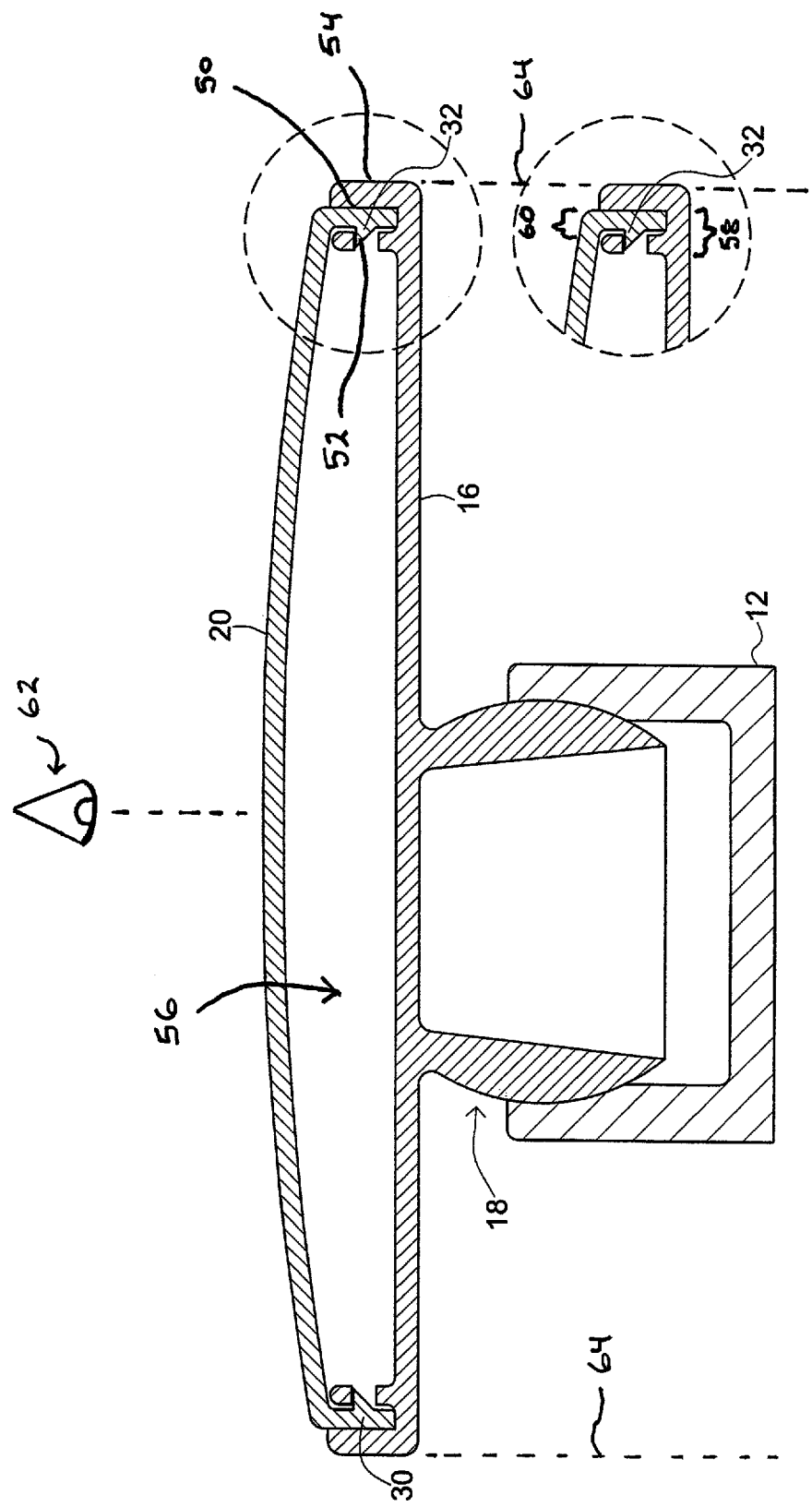
FIG. 3 is a side elevational cross-sectional view of a blind spot mirror, according to one embodiment of the invention.

FIG. 3 illustrates a blind spot mirror 10, according to one embodiment of the invention, wherein the blind spot mirror 10 includes a base 12. The base 12 is coupled to a mirror housing 16 by a ball and socket coupling member 18. The mirror housing 16 is coupled to a mirror 20, wherein the mirror 20 includes a first hook 30 and a second hook 32. The first hook 30 and the second hook 32 are disposed on the underside of the mirror 20. Each of the illustrated first and second hooks 30, 32 include a shank 50 extending directly from an underside of the illustrated mirror. Each hook includes a barb 52 protruding from the shank. In each of the illustrated hooks, the shank of each of the hooks is disposed between the illustrated associated U-shaped projections (U-shaped retainer) 26 and an outer wall 54 of the convex mirror housing and each of the barbs protrudes inwardly towards an interior region 56 of the convex mirror housing (away from the nearest outer wall of the convex mirror housing). In the illustrated example, an effective width of the barb 58 (the distance between the tip of the barb and the opposite side of the shank) is greater than a spacing 60 between the associated U-shaped projection and the associated nearest region of the outer wall of the convex mirror housing such that the associated U-shaped projection and the associated nearest region of the outer wall operate to trap the barb within the U-shaped projection. Accordingly, the hook is nested/trapped between the same and the barb will not dislodge from the U-shaped protrusion even if the hook is subject to lateral force since the outer wall will resist motion of the shank sufficient to allow the barb to dislodge. In the illustrated example, the spacing between the U-shaped protrusion and the nearest region of the outer wall is slightly more than the effective width of the illustrated shank. There is also shown a front-centered perspective view 62 and a orthogonal rear projection 64. As illustrated in FIG. 3, the mirror housing further includes a first groove or U-shaped retainer 24 and a second groove or U-shaped retainer 26 configured to secure to the first hook 30 and the second hook 32, respectively.

In operation of one embodiment of the invention, a user couples the base 12 of the blind spot mirror 10 to a corner of an automobile mirror. The off-center configuration of the ball and socket coupling member 18 is configured to create an enhanced view by disposing the mirror 10 over the edge of the automobile mirror housing. In addition, the blind spot mirror 10 includes a mirror surface area larger than the flat surface 14 of the base 12, thereby leaving most of the original automobile mirror still viewable. The user than adjusts the ball and socket coupling member 18 to view a blind spot of an automobile.

FIGS. 1-3 illustrate a blind spot mirror configured to attach to an automobile minor, thereby providing an enhanced view. The illustrated blind spot minor includes a base, a convex mirror housing and a convex mirror. The base has a flat rear surface configured to couple to an automobile minor. The convex mirror housing has a width and height (the width being the distance from the left edge of the convex minor housing to the right edge when FIG. 1 is viewed such that the element numbering thereof is horizontal and the height being the distance across the face of the mirror between the edges orthogonal to the right and left edges that define the width, wherein the combined height and width of the convex mirror housing is named the front profile or perimeter of the mirror housing) greater than each of the respective width and height of the base (wherein the width of the base is the distance between the left and right edges of the base and the height is the distance across the back of the base between the edges orthogonal to the left and right edges thereof), thereby concealing the base behind the convex mirror housing when viewed from the a centered front view (which may be alternatively described as a rear orthogonal projection of the front profile of the convex mirror housing fully encloses the base), pivotally coupled directly to the base through a ball and socket coupling member, which ball and socket coupling member is integral to (a unitary part of) and coupled directly to each of the base and the convex mirror housing. The illustrated ball and socket coupling member is coupled to the convex mirror housing substantially off-center on the convex minor housing but the entire base is still positioned directly behind the convex minor housing such that the base is not visible while a user is looking at the convex minor from a front centered view because a rear orthogonal projection of the front profile of the convex mirror housing fully encloses the base. The illustrated convex minor is disposed within the convex minor housing and coupled thereto through cooperation of a projection with a hook extending directly from an underside of the minor that cooperates with a U-shaped projection (squared projection with a hole) extending directly from a bottom interior surface and spaced away from an outside edge of the of the convex mirror housing. The illustrated flat rear surface of the base faces opposite the minor.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the Figures illustrate a mirror, a mirror housing, and a base, one skilled in the art would appreciate that the mirror, the mirror housing, and the base may vary in size, shape, design, configuration, color, length, height, width, and still perform its intended function.

Additionally, although the figures illustrate a hook and groove coupling member including a first hook, a second hook, a first groove member and a second groove member, one skilled in the art would appreciate that the hook and groove coupling member may be, but is not limited to, a single track coupled to the perimeter of the mirror housing, wherein the mirror includes a plurality of small hooks configured to secure to the track. In addition, the mirror may be coupled to the mirror housing by an adhesive.

It is also envisioned that one skilled in the art would appreciate that the mirror may vary in strength, concavity, angle, tint, surface area, and still perform its intended function.

Finally, it is envisioned that the components of the device may be constructed of a variety of materials, such as, but not limited to plastic, plastic composite, metal, metal alloys, glass, reflective material, rubber, rubber composites, textiles, etc. and still perform its intended function.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly, and use may be made, without departing from the principles and concepts of the invention as set forth in the claims. Further, it is contemplated that an embodiment may be limited to, consist of, or to consist essentially of, one or more of the features, functions, structures, methods described herein.

What is claimed is:

1. A blind spot mirror, comprising:
   a) a base having a flat rear surface;
   b) a convex mirror housing having a width and height greater than the base, thereby concealing the base behind the convex mirror housing in a manner such that an orthogonal rear projection of the convex mirror housing encloses the base and wherein the convex mirror housing is pivotally coupled directly to the base through a ball and socket coupling member, said ball and socket coupling member is integral to and coupled directly to each of the base and the convex mirror housing, wherein the ball and socket coupling member is coupled to the convex mirror housing substantially off-center on the convex mirror housing but the base is still positioned entirely directly behind the convex mirror housing; and
   c) a convex mirror disposed within the convex mirror housing and coupled thereto through cooperation of a projection with a hook, having a shank and a barb protruding from the shank, the shank extending directly from an underside of the mirror that cooperates with a U-shaped projection extending directly from a bottom interior surface and spaced away from an outside edge convex mirror housing; wherein the shank of the hook is disposed between the U-shaped projection and a nearest region of an outer wall of the convex mirror housing and the barb of the hook protrudes inwardly towards an interior of the convex mirror housing, wherein the flat rear surface of the base faces opposite the mirror, and wherein the base is not visible while a user is looking at the convex mirror from a front centered point of view.

2. The blind spot mirror of claim 1, wherein an effective width of the barb is greater than a spacing between the associated U-shaped projection and the associated nearest region of the outer wall of the convex mirror housing such that the associated U-shaped projection and the associated nearest region of the outer wall operate to trap the barb within the U-shaped projection.

3. The blind spot mirror of claim 1, wherein the convex mirror further includes a first hook and a second hook disposed on the underside of the convex mirror, and wherein the second hook is disposed opposite the first hook, the second hook including a shank having a barb protruding therefrom and the barb extending inwardly towards the interior of the convex mirror housing.

4. The blind spot mirror of claim 3, wherein the convex mirror housing further includes a first U-shaped projection and a second U-shaped projection configured to secure to the first hook and the second hook, respectively, wherein the shank of the second hook is disposed between the second U-shaped projection and an associated nearest region of the outer wall of the convex minor housing, and wherein an effective width of the barb of each of the first hook and the second hook is greater than a spacing between the associated U-shaped projection and the associated nearest region of the outer wall of the convex mirror housing such that the associated U-shaped projection and the associated nearest region of the outer wall of the convex minor housing operate to trap the associated barbs within the U-shaped projection.

5. The blind spot mirror of claim 1, wherein the ball and socket coupling member is disposed substantially off-center, 60/40 respectively, to the convex mirror housing.

6. The blind spot mirror of claim 1, wherein the ball and socket coupling member is disposed substantially off-center, 70/30 respectively, to the convex mirror housing.

7. The blind spot mirror of claim 1, wherein the socket coupling member is coupled to the base, disposed opposite of the flat rear surface.

8. The blind spot mirror of claim 1, wherein the ball coupling member is coupled to the convex mirror housing, disposed opposite of the convex mirror.

9. A blind spot mirror configured to attach to an automobile mirror, thereby providing an enhanced view, comprising:
   a) a base having a flat rear surface configured to couple to the automobile mirror;
   b) a convex mirror housing having a front profile larger than the base thereby completely obscuring the base when viewed from a front centered perspective, pivotally coupled directly to the base through a ball and socket coupling member, wherein the ball and socket coupling member is directly coupled to and a unitary part of each of the convex mirror housing and the base and is coupled substantially off-center on the convex mirror housing but not so far off-center that the base is visible behind the convex mirror housing from the front centered perspective; and
   c) a convex mirror disposed within the convex mirror housing; wherein the convex mirror is inset into a receiving portion around a perimeter of the convex mirror housing; wherein the convex mirror further includes a first hook and a second hook extending from and disposed on an underside of the convex mirror; wherein the convex mirror housing further includes a first squared projection with a hole and a second squared projection with a hole configured to secure to the first hook and the second hook, respectively; wherein the flat rear surface of the base faces opposite the convex mirror, and wherein each of the first and second hooks include a shank having a barb protruding therefrom, the shank of each hook being disposed between their associated squared projections and a nearest region of an outer wall of the convex mirror housing, and the barb of each hook protruding inwardly towards an inner region of the convex mirror housing.

10. The blind spot mirror of claim 9, wherein the ball and socket coupling member is disposed substantially off-center, 60/40 respectively, to the convex mirror housing, and wherein an effective width of one of the barbs is greater than a spacing between its associated squared projection and its associated nearest region of the outer wall of the convex mirror housing.

11. The blind spot mirror of claim 9, wherein the ball and socket coupling member is disposed substantially off-center, 70/30 respectively, to the convex mirror housing.

12. The blind spot mirror of claim 9, wherein the socket coupling member is coupled to the base, disposed opposite of the flat rear surface.

13. The blind spot mirror of claim 9, wherein the ball coupling member is coupled to the convex mirror housing, disposed opposite of the convex mirror.

14. A blind spot mirror, comprising:
   a) a base having a flat rear surface; wherein the flat rear surface of the base includes an adhesive, configured to couple the base to an automobile mirror;
   b) a convex mirror housing having a front profile larger than the base thereby completely obscuring the base when viewed from a front centered perspective, pivotally coupled directly to the base through a ball and socket coupling member, wherein the ball and socket coupling member is coupled to the convex mirror housing substantially off-center on the convex mirror housing but not so far off center as to reveal the base when viewed from the front of the convex mirror at a front centered position; wherein the socket coupling member is coupled to the base, disposed opposite of the flat rear surface; wherein the ball coupling member is coupled to the convex mirror housing, disposed opposite of the convex mirror; and c) a convex mirror disposed within the mirror housing; wherein the convex mirror is inset into a receiving portion around a perimeter of the convex mirror; wherein the convex mirror further includes a first hook and a second hook, each protruding from a back surface of the convex mirror and disposed on an underside of the convex mirror; wherein the convex mirror housing further includes a first squared protrusion with a hole and a second squared protrusion with a hole configured to secure to the first hook and the second hook, respectively, the squared protrusions extending from an interior surface of the convex mirror housing; wherein the flat rear surface of the base faces opposite the convex mirror, and wherein each of the first and second hooks include a shank having a barb protruding therefrom, the shank of each hook being disposed between their associated squared projections and a nearest region of an outer wall of the convex mirror housing, the barb of each hook protruding inwardly towards an inner region of the convex mirror housing, and an effective width of one of the barbs is greater than a spacing between its associated squared projection and its associated nearest region of the outer wall of the convex mirror housing.

15. The blind spot mirror of claim 14, wherein the ball and socket coupling member is disposed substantially off-center, 60/40 respectively, to the convex mirror housing.

16. The blind spot mirror of claim 14, wherein the ball and socket coupling member is disposed substantially off-center, 70/30 respectively, to the convex mirror housing.

* * * * *